United States Patent [19]

Brown, Jr. et al.

[11] 4,039,143

[45] Aug. 2, 1977

[54] ORGANIC HYDROCARBON SOLVENT-BASED GREEN TIRE LUBRICANT AND PROCESS

[75] Inventors: Edgar D. Brown, Jr., Schenectady; Richard M. Ronda, Mechanicville, both of N.Y.

[73] Assignee: General Electric Company, Waterford, N.Y.

[21] Appl. No.: 538,784

[22] Filed: Jan. 6, 1975

[51] Int. Cl.$^2$ .................. C10M 1/10; C10M 3/02; C10M 5/02; C10M 7/04
[52] U.S. Cl. .................. 252/28; 106/38.24; 252/49.6; 252/52 A
[58] Field of Search .................. 252/28, 49.6, 52 A; 106/38.24

[56] References Cited

U.S. PATENT DOCUMENTS

| | | | |
|---|---|---|---|
| 3,506,463 | 4/1970 | Holzinger | 106/38.24 |
| 3,532,624 | 10/1970 | Cekada | 252/28 |
| 3,554,910 | 1/1971 | Johnson | 252/49.5 |
| 3,574,112 | 4/1971 | Nelson | 106/38.24 |
| 3,632,844 | 1/1972 | Robins | 106/38.24 |
| 3,713,851 | 1/1973 | Cekada | 252/28 |
| 3,759,827 | 9/1973 | Groenhof et al. | 252/49.6 |

*Primary Examiner*—Delbert E. Gantz
*Assistant Examiner*—Irving Vaughn
*Attorney, Agent, or Firm*—John L. Young; E. Philip Koltos; Edward A. Hedman

[57] ABSTRACT

An improved preformulated internal green tire lubricant and bag release composition is disclosed which comprises a silicone fluid; an alkylene oxide polyol; a particulate solid for providing air bleed channels between the expanding pressure core and the green tire, the amounts of silicone fluid and polyol combined being present at a weight ratio of at least 0.6:1 with respect to the particulate solid; an organic hydrocarbon solvent; a thickening agent; a small effective amount of unsaturated fatty acid to improve lubricity and wet-out and sufficient suspension agents to provide a stabilized, non-settling suspension. A process for decreasing friction in the bag molding of tires using such a composition is also disclosed.

51 Claims, No Drawings

ORGANIC HYDROCARBON SOLVENT-BASED GREEN TIRE LUBRICANT AND PROCESS

This invention relates to compositions and methods for lubricating the surface of an expandable pressure core during the bag molding of tires. The compositions include an organic hydrocarbon solvent-based silicone-polyol combination, a particulate solid for providing channels to bleed air trapped between the expanding core and the green tire during vulcanization, a thickening agent, sufficient suspension agents to provide a non-settling suspension, and an unsaturated fatty acid for improved lubricity and wet-out.

BACKGROUND OF THE INVENTION

The technology of fluid pressure cores used by the industry in curing new tires and retreading old tires is described generally in C.V. Toddy, U.S. Pat. No. 2,937,406. In this technique, fluid pressure cores, such as full circle or sectional air bags, bladders, and the like, are inserted within uncured or green tires during vulcanization to force the external surface of the article into engagement with the mold by exerting pressure on the internal surface of the uncured tire. The Toddy patent discloses that lubrication of the interface between the external surface of the pressure core, or bag, and the internal surface of the tire is critical because of the high frictional forces developed as the bag expands against the inside surface of the tire. Unless relieved, these forces lead to a substantial reduction of thickness in the bag, particularly in the shoulder areas of the tire, and eventually cause premature failure of the bag. Toddy proposed to overcome this friction by molding integral lubricated rubber layers into the air bag. This method, however, requires specialized molding techniques and is difficult and expensive to accomplish.

Recent developments in mold release formulations have centered on utilizing formulas consisting of fluid lubricants, dispersing aids and particulate matter of a multifunctional nature. These have been employed to lubricate the interface between the external surface of the inflatable rubber bags and the internal surface of the green tire. Previously, materials such as talc, mica and clays of various sorts were used either dry or in suspensions to lubricate the inflatable rubber bag and thus minimize friction by providing at least a small separation between the soft yielding "green stock" and the expanding bag. Silicone oils have also been used to aid in the lubrication of the inflatable bag, and it was found that the more viscous the silicone the better it performed as a green tire lubricant.

In an effort to utilize the advantages of all of these substances, formulations were developed which consisted of a mixture of silicones, polyols and talc or mica clays. Such a formulation for a bag release agent is disclosed in Cekada, U.S. Pat. No. 3,532,624, in which a composition comprising a silicone fluid, a polyol, a particulate mica, and 25 to 55% by weight of a hydrocarbon solvent is sprayed on the surface of a conventional bag, i.e., one which does not include lubricated strips, just before expansion into the green tire.

A disadvantage of release compositions such as the Cekada formulation is that they provide poor wet-out, that is, the lubricant composition does not spread out evenly on the surface of the green tire. An ideal release agent should provide good wet-out, prolong bladder life, release effectively, both initially and after long term aging and cut down on defects, such as air bleed problems, and the like.

There has now been discovered a family of compositions based on silicone fluids which provide the desired advantages, i.e., good wet-out, prolonged bladder life, effective release, and reduction of air bleed problems.

One key feature is to add a small effective amount of an unsaturated fatty acid, e.g., oleic acid, which quite surprisingly improves both the wet-out and the lubricity of the composition.

A second key feature is to use a ratio of combined silicone and polyol to particulate solid which is greater than that ordinarily thought necessary, e.g., at least about 0.6:1, on a weight basis. Surprisingly, apparently because of the presence of unsaturated fatty acid in the composition, the materials still retain high air bleed efficiency at the somewhat lower particulate solids content.

In addition to outstanding lubricity, the new compositions have very good wet-out.

Accordingly, it is a primary object of this invention to provide a high lubricity composition with very good wet-out, using greater than the usual ratios of siloxanes and polyols to particulate solid material.

It is also an object to provide such compositions which include an unsaturated fatty acid additive to improve wet-out and lubricity, while maintaining air-bleed capability.

DESCRIPTION OF THE INVENTION

According to the present invention, in its broadest aspects, there are provided compositions for reducing the friction between an expanding fluid pressure core and the internal surface of a green tire during vulcanization, said composition comprising:

a. a high molecular weight poly(diorganosiloxane) fluid;
b. a high molecular weight alkylene oxide polyol;
c. a particulate solid for providing air bleed channels between the expanding pressure core and the green tire, the amounts of silicone fluid (a) and polyol (b) combined being present at a weight ratio of at least 0.6:1 with respect to the particulate solid;
d. a thickening agent;
e. a suspending agent;
f. a small, effective amount of unsaturated fatty acid for lubricity improvement and wet-out improvement; and a volatile carrier medium which consists of a minor amount of a lower alcohol (one to four carbon atoms) and a major amount of an organic hydrocarbon solvent.

The compositions are preferably thick and viscous, having a viscosity in the range of 10,000 and 40,000 cps. at 25° C.

The poly(diorganosiloxane) fluids or oils of the present compositions are well known to those skilled in the art. In general, they are high molecular weight linear polymers. More specifically, they are members of a family represented by the formula

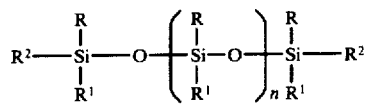

wherein R and R¹ are monovalent hydrocarbon radicals, such as aliphatic, haloaliphatic and cycloaliphatic radicals, e.g., alkyl, alkenyl, cycloalkyl, haloalkyl, including methyl, ethyl, propyl, chlorobutyl, cyclohexyl, trifluoropropyl, aryl radicals and halogenated aryl radicals, such as phenyl, chlorophenyl, xylyl, tolyl, and the like; aralkyl radicals, such as phenylethyl, benzyl, and the like, cyanoalkyl, such as cyanoethyl; and R and $R^1$ can be the same or different, but preferably are methyl or methyl and ethyl or methyl and phenyl, $n$ is a number within a range capable of conferring fluid or oil like properties on the polymer at 25° C., preferably a viscosity in the range of 40,000 and 100,000 cps. at 25° C., and wherein $R^2$ can include the same values as R and $R^1$ as well as hydroxyl, alkoxy, aryloxy, and the like.

Illustrative poly(diorganosiloxane) fluids will include poly(dimethylsiloxanes), copolymers of dimethylsiloxane and diphenylsiloxane, terpolymers of dimethylsiloxane, terpolymers of dimethylsiloxane, phenylmethylsiloxane and ethylmethylsiloxane, terpolymers of dimethylsiloxane, methylphenylsiloxane and methyltrifluoropropylsiloxane, copolymers of dimethylsiloxane and ethylmethylsiloxane, poly(ethylmethylsiloxane), copolymers of dimethylsiloxane and methylorganoethylsiloxane. The homo- and copolymers can be blocked at the ends, e.g., with triorganosiloxy units, such as trimethylsiloxane, dimethylbenzylsiloxane, dimethylphenylsiloxane units, and the like. Also included are copolymers including diorganosiloxane, e.g., dimethylsiloxane, and polyether units. Preferably, the organo substituents will be selected from methyl and phenyl groups. However, vinyl, trifluoropropyl, ethyl, propyl, octadecyl, allyl, cyclohexenyl, naphthyl, chloromethyl, bromophenyl, and the like can be present as substituents.

The fluids are prepared by methods which are well known and widely used. For example, the appropriate diorganodihalosilane (or mixture thereof) is hydrolyzed to make a mixture of linear and cyclic prepolymers. These, or mixtures of the individual linear and cyclic prepolymers are then equilibrated with compounds, such as disiloxanes, to provide the triorganosiloxy terminating groups. The lower the concentration of equilibration compounds, the higher the molecular weight. The fluid is washed with water, neutralized, dried and devolatilized. Detailed directions are set forth in the Encyclopedia of Polymer Science and Technology, John Wiley & Sons, New York, Vol. 12, page 522 et seq. (1970). They are also widely available commercially from a number of sources.

The amount of silicone fluid to be used in the composition can vary, but generally will range from 5 to 15% by weight, and preferably about 10% by weight.

The alkylene oxide polyol can be either a homopolymer of ethylene or propylene glycols or a copolymer of the two, or a mixture of at least two of the foregoing. Its molecular weight should be high, e.g., at least 1,000. The polyethylene glycols will be of the general formula $HOCH_2(CH_2OCH_2)_nCH_2OH$ or 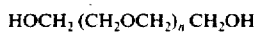

wherein $n$ and $x$ are numbers sufficiently high to give a molecular weight of at least 1,000. The polypropylene glycols will be of the general formula

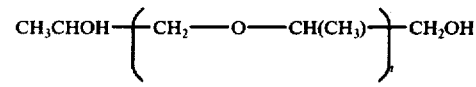

and 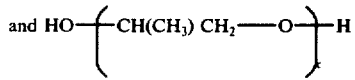

wherein $n$ and $x$ are as above defined. These are made by the alkaline catalyzed reaction of ethylene glycol with varying amounts of ethylene oxide, and with propylene glycol and propylene oxide, in well known procedures. Preferably, the alkylene oxide polyol will be an ethylene oxide polyol, a propylene oxide polyol, or a copolyol of ethylene oxide and propylene oxide. These are available from a number of commercial sources such as Olin Corp., WS-661; Union Carbide HB-660; Jefferson Chemical, WL-2000A, etc.

The amount of alkylene oxide polyol in the composition can vary but there should be at least enough present to coact with the silicone to provide lubricity. Generally, an amount of between 5 and 15% by weight and preferably about 12.5% by weight will be used, the higher amounts with lower amounts of silicone and vice versa.

The particulate solid is included in the compositions to provide channels between the bag and the tire to permit air bleed. Any conventional material employed for this purpose can be used. Especially useful are mica and talc. The particle size can vary broadly, but preferably will be within the range of 160 to 600 mesh, U.S. Standard Sieve. Especially preferably, the particle size will be about 325 microns.

The amount of the particulate solid can vary, but is generally in the range of 16.7 and 50% by weight. Preferably, the amount of the particulate solid will be about 34%. The smaller amounts in the range stated above are used with higher contents of silicone and polyol, i.e., more dilute compositions.

The important factor in the present composition is the relatively low amount of a particulate solid to combined silicone and polyol employed. In general, there will be employed at least 0.6 parts of silicone and polyol combined to 1 part of particulate solid, by weight. If this amount of solid is exceeded, then lubricity is adversely affected. With respect to the limit of particulate solid in the range, the important factor is the need to provide at least enough solid material to permit its function to provide channels for air bleed. It appears that a practical lower level of particulate solid is 2 parts of silicone and polyol combined to 1 part of particulate solid, on a weight basis.

The thickening agent can comprise a solid or solids or, preferably, a gelatinous composition comprising a solid component combined with an alcohol component. The nature of the solid component of the thickening agent can vary broadly. For example, mineral colloids, known in the art, and bentonite clays can be used, as well as organic thickeners, such as carboxylated vinyl polymers, e.g., the Carbopol products of B.F. Goodrich Co. Especially preferred is bentonite clay. The alcohol component is preferably a lower alcohol, i.e., having 1 to 4 carbon atoms, such as methanol, ethanol and propanol. Especially preferred as the thickening agent composition is a gel comprising bentonite clay, methanol and a relatively small amount of water. These thickening agents function, along with the stabilizing agents in the compositions, to prevent the particulate matter from settling out. It has been found that an amount in the range of 0.05 and 10% by weight of the total is sufficient for this purpose, with about 3.2% by weight being preferred.

The suspending agent is chosen from the group of sorbitan esters, such as sorbitan sesquioleate. The amount will be selected to provide a stable, one-phase mixture of organic hydrocarbon solvent, resins and other additives. Generally, this amount will range from 0.05 to 5% by weight, with about 2.5% by weight being preferred.

The unsaturated fatty acid appears to improve the "wet-out" characteristics of the lubricant composition, as well as the lubricity. It has been discovered that a small amount of the unsaturated fatty acid is sufficient to accomplish this purpose, specifically, an amount in the range of 0.005 to 1% by weight and, preferably, about 0.2% by weight.

Suitable such acids are of the general formula:

$$C_n H_{2n-m} COOH$$

wherein $n$ is from 8 to 30 and $m$ is 1, 3 or 5.

Illustrative of such acids are oleic acid, linoleic acid, linolenic acid, and the like. Especially preferred is oleic acid.

DESCRIPTION OF THE PREFERRED EMBODIMENT

The following examples illustrate the process and compositions of this invention. They are not to be construed to limit the invention in any manner whatsoever. All parts are by weight.

EXAMPLE 1

Into a suitable mechanical "cement mixer" apparatus are charged 30 parts of solvent (Shell Sol 71). To this is added 1.6 parts of bentonite clay (National Lead, Bentone 38) with the mixer rotating to disperse the clay in the solvent. 1.6 parts of 95% methanol in water, by volume, is then added and blended well to thicken the mixture by forming a gel in situ. Once thickening occurs (after about 1 hour of mixing), 10 parts of silicone fluid (Viscasil 60,000) is added. After the silicone is dispersed, into the mixer are charged a total of 12.5 parts of polyol (8.75 parts of Olin Corp. WS-661 and 3.75 parts of Jefferson Chem. WL-2000A), 2.5 parts of sorbitan sesquioleate suspending agent (Atlas Chem., Arlacel C), 0.2 parts of oleic acid, 34 parts of mica, and 7.6 parts of solvent (Shell Sol 71) to flush down the side of the mixer. The mixer is then rotated at highest speed for about 6 to 8 hours. An additional 1.6 parts of solvent are then added and dispersed to make up for methanol losses that usually occur during mixing.

A well mixed and thoroughly suspended composition according to this invention is thus produced.

This composition is applied to the inner liner of tire stock, which is then bag molded. The composition exhibits high lubricity, good wet-out and satisfactory air bleed.

In a test of this composition, the following values were obtained:

| Property | Value |
| --- | --- |
| Friction (Stick) | 0.15 ± 0.02 |
| Fricton (Slip) | 0.12 ± 0.02 |
| Solids (2 hrs. — 120° C.) | 58 – 62% |
| Viscosity, RVP Brookfield (#3 spindle at 3 RPM — 2 minutes) | 15,000 – 25,000 cps. |
| Centrifuge Stability (40 ml, 2000 RPM — 5 minutes) | Top — 5ml solvent max. Bottom — No compacting |

COMPARISON A

For purposes of comparison, a composition is prepared as follows:

Into a suitable cement mixer apparatus, as in Example 1, charge 37.7 parts of solvent (Shell 145-66). Then add 10.0 parts of silicone fluid (Viscasil 60,000) and stir, using rapid agitation, until thoroughly mixed. Next add 10.0 parts of polyol (Jefferson Chem., WL-660), 3 parts of sorbitan sesquioleate (Atlas Chem., Arlacel C), 0.3 parts of oleic acid and 2 parts of methanol, and stir until uniform. Add 2 parts bentonite clay (National Lead, Bentone 38) and 35 parts mica, 160 mesh, U.S. Standard Sieve (Diamond Co.) to the reactor and blend, using rapid agitation, for 2 hours.

The material is then transferred to a Cowles Morehouse Mill and milled at a tight mill setting until smooth.

In a test of this comparative composition, the following values were obtained:

| Property | Value |
| --- | --- |
| Friction (Stick) | 0.19 ± 0.03 |
| Friction (Slip) | 0.17 ± 0.03 |
| Solids (2 hrs. - 120° C.) | 58 – 62% |
| Viscosity, RVP Brookfield (#3 spindle at 3 RPM — 2 minutes) | 15,000 – 35,000 cps. |
| Centrifuge Stability (40 ml, 2000 RPM — 5 minutes) | Top — 2.5 ml solvent max. Bottom — no compacting |

It is seen that the material according to this invention has higher lubricity. It should be noted that the ratio of siloxane and polyol to mica in Example 1 is about 0.66:1 and the ratio of these components in the formulation for comparison purposes is about 0.57:1.

Obviously, other variations will suggest themselves to those skilled in the art in view of the above detailed description. For example, instead of mica, Georgia talc of 160 to 600 mesh (U.S. Standard Sieve) can be substituted. Instead of the ethylene oxide-propylene oxide copolyol, the corresponding homopolymers and other copolymers can be used (e.g., Union Carbide, Product Designation HB-660; Jefferson Chemical, Product Designation WL-850A). Instead of the sorbitan oleate ester, a sorbitan palmitate can be used as a suspending agent. Instead of bentonite clay as a thickener, other mineral colloids can be used as well as polymeric thickeners of the type designated Carbopol 934 (B.F. Goodrich Co.). Instead of oleic acid as the unsaturated fatty acid, linoleic acid and linolenic acid can be used. Instead of methanol in the composition, other lower alcohols, such as ethanol and propanol, can be used. Instead of the mineral spirits (Shell Sol 71), other hydrocarbon solvents can be used such as hexane, heptane, isooctane, toluene, benzene, ligroin, and the like. All such modifi-

We claim:

1. A composition for reducing the friction between an expanding fluid pressure core and the internal surface of a green tire during vulcanization, said composition comprising:
   a. from 5 to 15% of a poly(diorganosiloxane) fluid having a viscosity in the range of 40,000 to 100,000 cps. at 25° C.;
   b. from 5 to 15% of a high molecular weight alkylene oxide polyol, the total of (a) and (b) combined being from 10 to 30% by weight;
   c. from 16.7 to 50% of a particulate solid for providing air bleed channels between the expanding pressure core and the green tire;
   d. from 0.05 to 10% of a thickening agent;
   e. from 0.05 to 5% of a suspending agent;
   f. from 0.005 to 1% of an unsaturated fatty acid, and the balance comprising a liquid, volatile organic hydrocarbon carrier medium, and wherein the ratio of combined amounts of (a) and (b) to (c), by weight, is at least 0.6:1.

2. A composition as defined in claim 1 wherein the ratio of combined amount of (a) and (b) to (c), by weight is in the range of from 0.6:1 to 2:1.

3. A composition as defined in claim 1 which has a viscosity in the range of 10,000 and 40,000 cps. at 25° C.

4. A composition as defined in claim 1 wherein said poly(diorganosiloxane) fluid (a) contains dimethylsiloxane units.

5. A composition as defined in claim 1 wherein said alkylene oxide polyol (b) has a molecular weight of at least 1,000.

6. A composition as defined in claim 5 wherein said alkylene oxide polyol (b) is an ethylene oxide polyol, a propylene oxide polyol, or a copolyol of ethylene oxide and propylene oxide.

7. A composition as defined in claim 1 wherein said particulate solid (c) has a size ranging from 160 to 600 mesh, U.S. Standard Sieve.

8. A composition as defined in claim 1 wherein said particulate solid (c) is mica or talc.

9. A composition as defined in claim 1 wherein said thickening agent (d) is a composition comprising bentonite clay.

10. A composition as defined in claim 1 wherein said suspending agent (e) is a sorbitan ester.

11. A composition as defined in claim 10 wherein said sorbitan ester is sorbitan sesquioleate.

12. A composition as defined in claim 1 wherein said unsaturated fatty acid (f) is oleic acid.

13. A composition as defined in claim 9 wherein said bentonite clay is combined with methanol in the form of a gel.

14. A composition as defined in claim 13 wherein said gel has been formed in situ.

15. A composition for reducing the friction between an expanding fluid pressure core and the internal surface of a green tire during vulcanization, said composition comprising;
   a. about 10% of a poly(diorganosiloxane) fluid having a viscosity in the range of from about 55,000 to 65,000 cps. at 25° C.;
   b. about 12.5% of a high molecular weight alkylene oxide polyol;
   c. about 34% of a particulate solid for providing air bleed channels between the expanding pressure core and the green tire;
   d. about 3.2% of a thickening agent;
   e. about 2.5% of sorbitan sesquioleate;
   f. about 0.2% of oleic acid;

and the balance comprising a liquid, volatile organic hydrocarbon carrier medium, and wherein the ratio of combined amounts of (a) and (b) to (c), by weight, is at least 0.6:1.

16. A process for reducing friction in the bag molding of green tires which comprises applying between the surface of an expanding fluid pressure core and the internal surface of a green tire during vulcanization a composition comprising:
   a. from 5 to 15% of a poly(diorganosiloxane) fluid having a viscosity in the range of 40,000 to 100,000 cps. at 25° C.;
   b. from 5 to 15% of a high molecular weight alkylene oxide polyol, the total of (a) and (b) combined being from 10 to 30% by weight;
   c. from 16.7 to 50% of a particulate solid for providing air bleed channels between the expanding pressure core and the green tire;
   d. from 0.05 to 10% of a thickening agent;
   e. from 0.05 to 5% of a suspending agent;
   f. from 0.005 to 1% of an unsaturated fatty acid, and the balance comprising a liquid, volatile organic hydrocarbon carrier medium, and wherein the ratio of combined amounts of (a) and (b) to (c), by weight, is at least 0.6:1.

17. A process as defined in claim 16 wherein the ratio of combined amounts of (a) and (b) to (c), by weight, is in the range of from 0.6:1 to 2:1.

18. A process as defined in claim 16 wherein said composition has a viscosity in the range of 10,000 and 40,000 cps. at 25° C.

19. A process as defined in claim 16 wherein said poly(diorganosiloxane) fluid (a) contains dimethylsiloxane units.

20. A process as defined in claim 16 wherein said alkylene oxide polyol (b) has a molecular weight of at least 1,000.

21. A process as defined in claim 20 wherein said alkylene oxide polyol is an ethylene oxide polyol, a propylene oxide polyol, or a copolyol of ethylene oxide and propylene oxide.

22. A process as defined in claim 15 wherein said particulate solid (c) has a size ranging from 160 to 600 mesh, U.S. Standard Sieve.

23. A process as defined in claim 16 wherein said particulate solid (c) is mica or talc.

24. A process as defined in claim 16 wherein said thickening agent (d) is a composition comprising bentonite clay.

25. A process as defined in claim 16 wherein said suspending agent (e) is a sorbitan ester.

26. A process as defined in claim 25 wherein said sorbitan ester is sorbitan sesquioleate.

27. A process as defined in claim 16 wherein said unsaturated fatty acid (f) is oleic acid.

28. A process as defined in claim 24 wherein said bentonite clay is combined with methanol in the form of a gel.

29. A process as defined in claim 28 wherein said gel has been formed in situ.

30. A process for reducing friction in the bag molding of green tires which comprises applying between the surface of an expanding fluid pressure core and the internal surface of a green tire during vulcanization a composition comprising:
- a. about 10% of a poly(diorganosiloxane) fluid having a viscosity in the range from about 55,000 to 65,000 cps. at 25° C.;
- b. about 12.5% of a high molecular weight alkylene oxide polyol;
- c. about 34% of a particulate solid for providing air bleed channels between the expanding pressure core and the green tire;
- d. about 3.2% of a thickening agent;
- e. about 2.5% of sorbitan sesquioleate;
- f. about 0.2% of oleic acid;

and the balance comprising a liquid, volatile organic hydrocarbon carrier medium, and wherein the ratio of combined amounts of (a) and (b) to (c), by weight, is at least 0.6:1.

31. A composition for reducing the friction between an expanding fluid pressure core and the internal surface of a green tire during vulcanization, said composition comprising:
- a. from 5 to 15% of a poly(diorganosiloxane) fluid having a viscosity in the range of 40,000 to 100,000 cps. at 25° C.;
- b. from 5 to 15% of a high molecular weight alkylene oxide polyol, the total of (a) and (b) combined being from 10 to 30% by weight;
- c. from 16.7 to 50% of a particulate solid for providing air bleed channels between the expanding pressure core and the green tire;
- d. from 0.05 to 10% of a thickening agent comprising bentonite clay and a lower alcohol of from 1 to 4 carbon atoms;
- e. from 0.05 to 5% of a suspending agent consisting essentially of sorbitan sesquioleate; and
- f. from 0.005 to 1% of an unsaturated fatty acid, and the balance comprising a liquid, volatile organic hydrocarbon carrier medium, and wherein the ratio of combined amounts of (a) and (b) to (c), by weight, is at least 0.6:1.

32. A composition as defined in claim 31 wherein the ratio of combined amount of (a) and (b) to (c), by weight is in the range of from 0.6:1 to 2:1.

33. A composition as defined in claim 31 which has a viscosity in the range of 10,000 and 40,000 cps. at 25° C.

34. A composition as defined in claim 31 wherein said poly(diorganosiloxane) fluid (a) contains dimethylsiloxane 35. A composition as defined in claim 31 wherein said alkylene oxide polyol (b) has a molecular weight of at least 1,000.

36. A composition as defined in claim 35 wherein said alkylene oxide polyol (b) is an ethylene oxide polyol, a propylene oxide polyol, or a copolyol of ethylene oxide and propylene oxide.

37. A composition as defined in claim 31 wherein said particulate solid (c) has a size ranging from 160 to 600 mesh, U.S. Standard Sieve.

38. A composition as defined in claim 31 wherein said particulate solid (c) is mica or talc.

39. A composition as defined in claim 31 wherein said lower alcohol is methanol.

40. A composition as defined in claim 39 wherein said bentonite clay is combined with methanol in the form of a gel.

41. A composition as defined in claim 31 wherein said unsaturated fatty acid (f) is oleic acid.

42. A process for reducing friction in the bag molding of green tires which comprises applying between the surface of an expanding fluid pressure core and the internal surface of a green tire during vulcanization a composition comprising:
- a. from 5 to 15% of a poly(diorganosiloxane) fluid having a viscosity in the range of 40,000 to 100,000 cps. at 25° C.;
- b. from 5 to 15% of a high molecular weight alkylene oxide polyol, the total of (a) and (b) combined being from 10 to 30% by weight;
- c. from 16.7 to 50% of a particulate solid for providing air bleed channels between the expanding pressure core and the green tire;
- d. from 0.05 to 10% of a thickening agent comprising bentonite clay and a lower alcohol of from 1 to 4 carbon atoms;
- e. from 0.05 to 5% of a suspending agent consisting essentially of sorbitan sesquioleate;
- f. from 0.005 to 1% of an unsaturated fatty acid, and the balance comprising a liquid, volatile organic hydrocarbon carrier medium, and wherein the ratio of combined amounts of (a) and (b) to (c), by weight, is at least 0.6:1.

43. A process as defined in claim 42 wherein the ratio of combined amounts of (a) and (b) to (c), by weight, is in the range of from 0.6:1 to 2:1.

44. A process as defined in claim 42 wherein said composition has a viscosity in the range of 10,000 and 40,000 cps. at 25° C.

45. A process as defined in claim 42 wherein said poly(diorganosiloxane) fluid (a) contains dimethylsiloxane units.

46. A process as defined in claim 42 wherein said alkylene oxide polyol (b) has a molecular weight of at least 1,000.

47. A process as defined in claim 46 wherein said alkylene oxide polyol is an ethylene oxide polyol, a propylene oxide polyol, or a copolyol of ethylene oxide and propylene oxide.

48. A process as defined in claim 42 wherein said particulate solid (c) has a size ranging from 160 to 600 mesh, U.S. Standard Sieve.

49. A process as defined in claim 42 wherein said particulate solid (c) is mica or talc and said unsaturated fatty acid (f) is oleic acid.

50. A process as defined in claim 42 wherein said lower alcohol is methanol.

51. A process as defined in claim 50 wherein said bentonite clay is combined with methanol in the form of a gel.

* * * * *